(12) United States Patent
Wall et al.

(10) Patent No.: US 7,750,254 B2
(45) Date of Patent: Jul. 6, 2010

(54) SELF-ADJUSTING SUPPORT SKIS FOR WEIGHING DEVICE

(75) Inventors: Joseph E. Wall, Fairfield, CT (US); Steven H. Joyce, Wallingford, CT (US); Jeffrey A. Gateman, Killingworth, CT (US); Eric A. Belec, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 107 days.

(21) Appl. No.: 11/957,129

(22) Filed: Dec. 14, 2007

(65) Prior Publication Data

US 2009/0152020 A1 Jun. 18, 2009

(51) Int. Cl.
*G01G 19/40* (2006.01)
*B07C 5/16* (2006.01)

(52) U.S. Cl. .................. 177/25.15; 177/145; 271/2

(58) Field of Classification Search .............. 271/2; 177/25.15, 145; 705/407
See application file for complete search history.

(56) References Cited

U.S. PATENT DOCUMENTS

| | | | | |
|---|---|---|---|---|
| 2,841,270 | A * | 7/1958 | La Bombard | 198/626.6 |
| 3,951,257 | A * | 4/1976 | Storace et al. | 198/626.6 |
| 4,742,878 | A * | 5/1988 | Freeman et al. | 177/25.15 |
| 4,778,018 | A | 10/1988 | Cordery et al. | |
| 4,836,313 | A | 6/1989 | Hubbard | |
| 4,856,604 | A | 8/1989 | Sisson et al. | |
| 5,190,115 | A * | 3/1993 | Dolan et al. | 177/25.15 |
| 5,723,825 | A | 3/1998 | Dolan et al. | |
| 5,726,393 | A | 3/1998 | Lyga | |
| 5,890,714 | A * | 4/1999 | Brooks et al. | 271/240 |
| 6,024,429 | A * | 2/2000 | Coffy et al. | 347/7 |
| 6,940,025 | B1 * | 9/2005 | Salomon | 177/25.15 |
| 2006/0214349 | A1 * | 9/2006 | Defosse et al. | 271/2 |
| 2006/0220294 | A1 * | 10/2006 | Sye | 271/2 |

* cited by examiner

*Primary Examiner*—Randy W Gibson
(74) *Attorney, Agent, or Firm*—Steven Shapiro; Angelo N. Chaclas

(57) ABSTRACT

According to some embodiments a system and an apparatus comprise a registration wall, a weighing device located adjacent to the registration wall, a belt drive mechanism, a plurality of inboard skis, and a plurality of outboard skis. The belt drive mechanism extends across the weighing device for advancing a mail piece relative to the weighing device and the belt drive mechanism is located at a first distance from the registration wall. The plurality of inboard skis are located substantially at the first distance from the registration wall and are located beneath the belt drive mechanism for urging the mail piece upwardly toward the drive belt mechanism. The plurality of outboard skis is coplanar with the plurality of inboard skis for supporting an end of the mail piece. The plurality of outboard skis is located at a second distance from the registration wall. The second distance is greater than the first distance. The plurality of outboard skis adjust to the thickness of a mail piece that is transported between a plurality of inboard skis and the top registration drive belt mechanism.

16 Claims, 9 Drawing Sheets

SELF-ADJUSTING SUPPORT SKIS FOR WEIGHING DEVICE

BACKGROUND

A mailing machine, such as a Pitney Bowes DM1000, may automatically feed a mail piece, seal a flap of the mail piece, imprint postage on the mail piece and stack uniform mail pieces at speeds of up to 260 letters per minute. The mailing machine may handle mail pieces ranging in size from post cards to 10"×13" flats and up to ¾" thick, intermixed and in a single stream. Intermixing sizes may reduce a need to sort mail by size.

Some mail machines may comprise an in-line weighing mechanism, such as the Pitney Bowes Weigh-on-the-Way™ ("WOW") mechanism. The in-line weighing mechanism may weigh each mail piece to ensure that proper postage indicia will be applied. When a mail piece arrives at the in-line weighing mechanism, a weighing signal may indicate that an accurate measurement has been taken and that the mail piece may be advanced for printing of postage indicia. This significantly reduces the time it takes to obtain an accurate weight of the mail piece.

When weighing flats, or mail pieces large enough that a portion of the mail piece is unsupported, the unsupported portions may flutter (i.e. an oscillating motion). This flutter may increase an amount of time required for the weighing signal to indicate that the mail piece has been accurately weighed.

SUMMARY

Generally, a system and an apparatus comprise a registration wall, a weighing device located adjacent to the registration wall, a belt drive mechanism, a plurality of inboard skis, and a plurality of outboard skis. The belt drive mechanism extends across the weighing device for advancing a mail piece relative to the weighing device and the belt drive mechanism is located at a first distance from the registration wall. The plurality of inboard skis are located substantially at the first distance from the registration wall and are located beneath the belt drive mechanism for urging the mail piece upwardly toward the drive belt mechanism. The plurality of outboard skis is coplanar with the plurality of inboard skis for supporting an end of the mail piece. The plurality of outboard skis is located at a second distance from the registration wall. The second distance is greater than the first distance.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, descriptions, and claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Currently, stationary WOW transport rails only provide support for very thick mail pieces because the transport rails are located well below the surface of a transport belt to allow for the transport of a thickest allowable mail pieces without creating a binding condition between the stationary rails and the belt. The following provides outboard support for flats, regardless of thickness, by eliminating the stationary rails and extending the WOW transport skis outboard which may improve stabilization of the flat during a weighing process which in turn may significantly reduces the time it takes to obtain an accurate weight.

Figure 1:
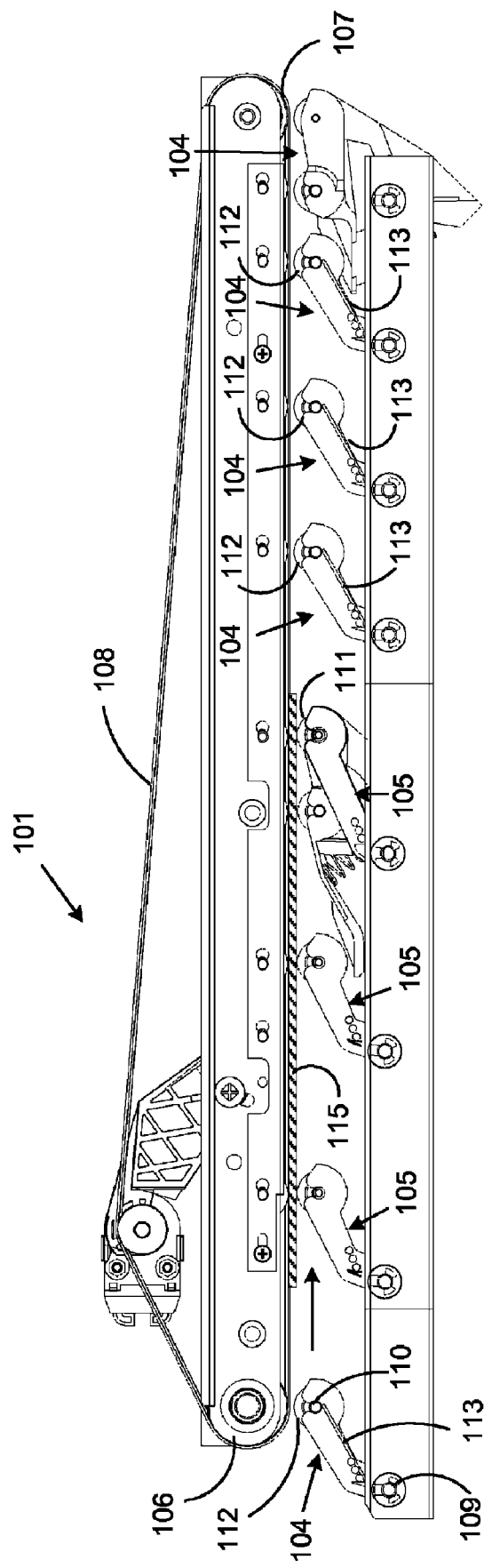
FIG. 1 illustrates a schematic side view of an apparatus according to some embodiments.
Figure 1A:
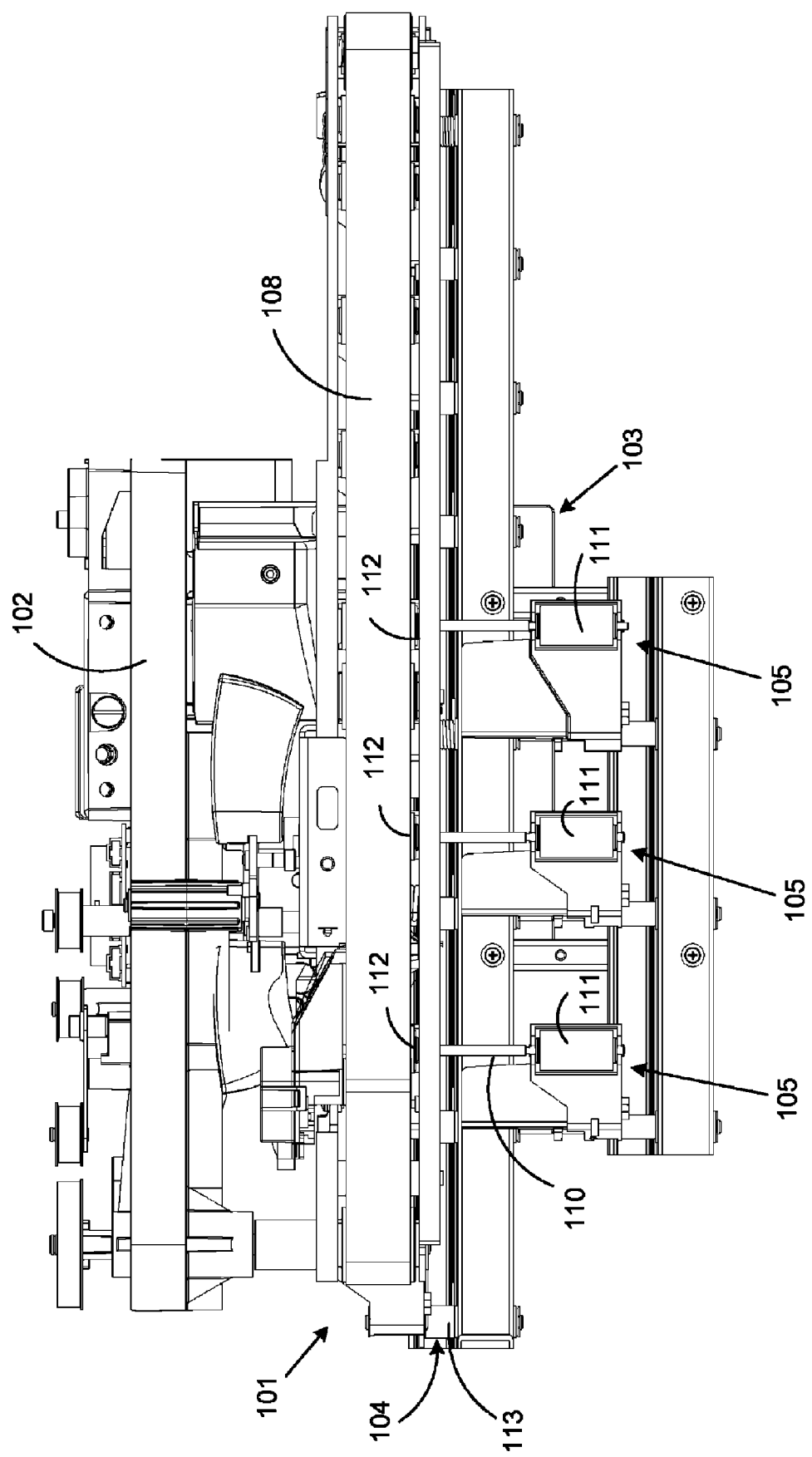
FIG. 1A illustrates a plan view of an apparatus according to some embodiments.
Figure 1B:
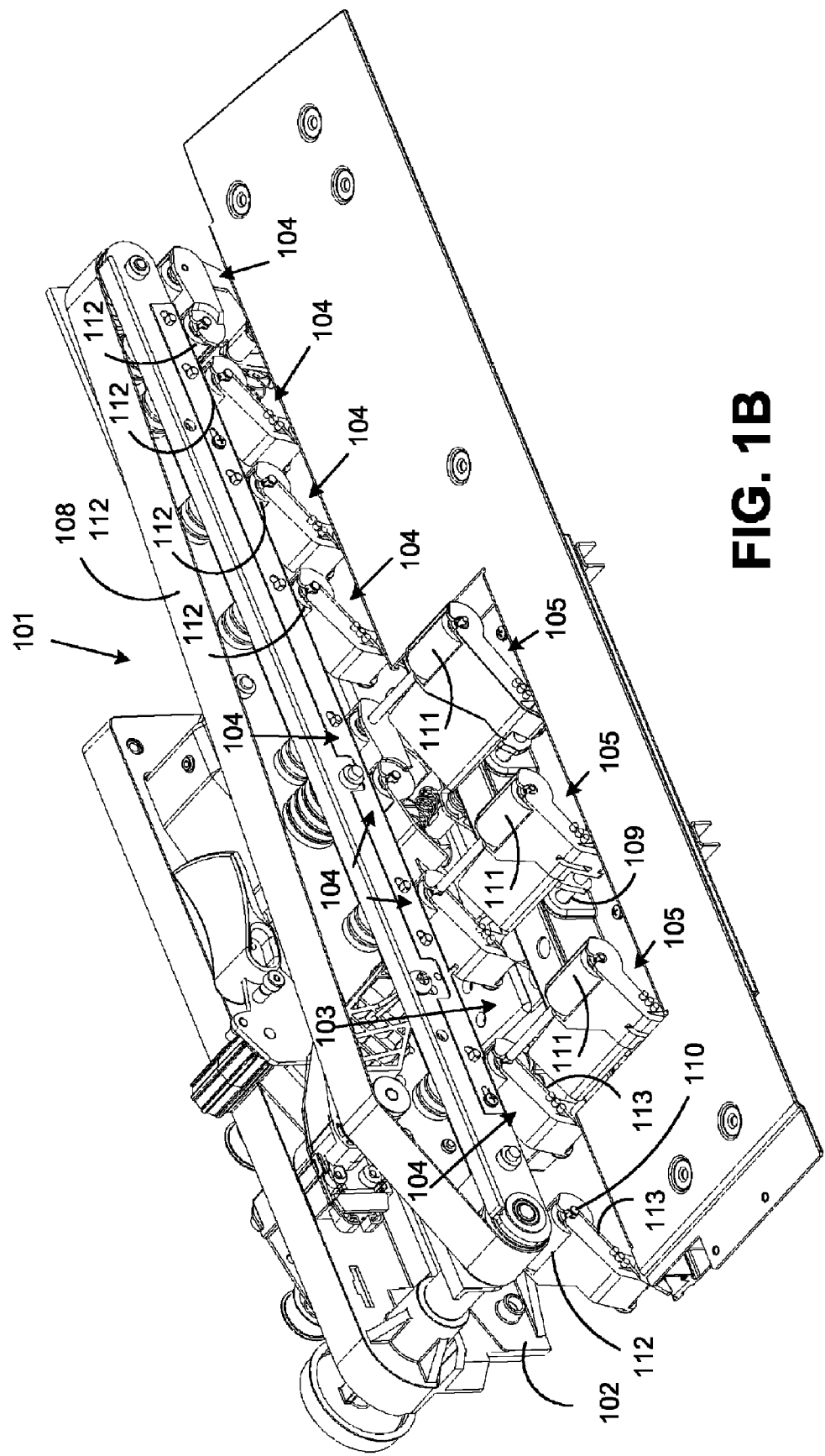
FIG. 1B illustrates a perspective view of an apparatus according to some embodiments.

Now referring to FIG. 1, FIG. 1A, and FIG. 1B, an embodiment of an apparatus 100 is illustrated. In some embodiments, FIG. 1 illustrates a schematic side view of the apparatus 100, FIG. 1A illustrates a plan view of the apparatus 100, and FIG. 1B illustrates a perspective view of the apparatus 100. Apparatus 100 may comprise a belt drive mechanism 101, a registration wall 102, a weighing device 103, a plurality of inboard skis 104, a plurality of first pins 109, a plurality of inboard rollers 112, a plurality of second pins 110, a plurality of outboard rollers 111, and a plurality of outboard skis 105.

The registration wall 102, as illustrated in FIG. 1A, may be fixably mounted to a housing (not shown) and may extend generally perpendicular relative to the weighing device 103 and parallel to a path of travel. The belt drive mechanism 101 may be located at a first distance from the registration wall. The belt drive mechanism 101 may comprise a belt 108, a first pulley 106 and a second pulley 107. At least one of the first pulley 106 and the second pulley 107 may be powered by a motor. In some embodiments, the belt 108 may be approximately one and fifteen hundredths of an inch wide. In some embodiments, the drive belt 108 may be approximately two and three quarter inches from the registration wall 102 and in some embodiments, the drive belt may be approximately one and three quarter inches from the registration wall 102.

The registration wall 102 may align a mail piece on the path of travel as the belt drive mechanism 101 couples the mail piece via the belt 108 and drives the mail piece in a drive direction. As illustrated, the drive direction of the belt drive mechanism 101 may be counter clockwise. The registration wall 102 may extend across the weighing device 103 for advancing a mail piece relative to the weighing device 103.

The drive belt mechanism 101 may stop advancing the mail piece when the mail piece is over the weighing device 103 so the weighing device 103 may weigh the mail piece as it travels on the path of travel. The weighing device 103 may comprise a load cell not separately shown and may be located adjacent to the registration wall 102.

The plurality of inboard skis 104 may be located substantially at the first distance from the registration wall and may be located beneath the belt drive mechanism 101 for urging the mail piece 115 upwardly toward the drive belt mechanism 101. In other words, a top surface of the mail piece 115 may be held against the belt 108 by the inboard plurality of skis 104 that push up against the bottom surface of the mail piece 115 with the top surface of the mail piece 115 held against the belt 108, the belt 108 is able to apply a drive force necessary to move the mail piece 115.

The plurality of outboard skis 105 may be coplanar with the plurality of inboard skis 104 for supporting an end of the mail piece. The plurality of outboard skis 105 may be located at a second distance from the registration wall 102 and as illustrated, the second distance is greater than the first distance. As illustrated, the plurality of outboard skis 105 may also be inclined upwardly and towards a drive direction of the belt drive mechanism 101.

The plurality of inboard skis 104 may be pivotally coupled to the weighing device and the plurality of outboard skis 105 may be pivotally coupled to the weighing device. Pivotally coupling each ski 104/105 may allow the plurality of inboard skis 104 and the plurality of outboard skis 105 to adjust to a thickness of a mail piece that is moved between the inboard skis 104 and the drive belt mechanism 101. The plurality of outboard skis 105 may also adjust to the thickness of the mail piece in response to the inboard skis 104 adjusting. As illustrated, the plurality of inboard skis 104 is inclined upwardly and towards a drive direction of the belt drive mechanism 101. In some embodiments, each ski of the plurality of inboard skis 104 may comprise a spring 113, and each ski of the plurality of outboard skis 105 may not comprise a spring. In some embodiments, the plurality of inboard skis 104 comprise a greater number than the plurality of outboard skis 105. In some embodiments, the drive mechanism 101, registration wall 102, inboard skis 104 and outboard skis 105, first pins 109 and second pins 110, and inboard rollers 112 and outboard rollers 111 are coupled to a weighing device 103.

Each of the plurality of outboard skis 105 is coupled to a respective one of the plurality of inboard skis 104 via one of the plurality of first pins 109 and via one of the plurality of second pins 110. The first pin 109 may couple a bottom portion of a respective one of the plurality of outboard skis 105 to a bottom portion of a respective one of the plurality of inboard skis 104. Each second pin 110 may couple a top portion of a respective one of the plurality of outboard skis 105 to a top portion of a respective one of the plurality of inboard skis 104. In some embodiments, the first pin may be a pivot shaft and the second pin may be a roller shaft.

Figure 2:
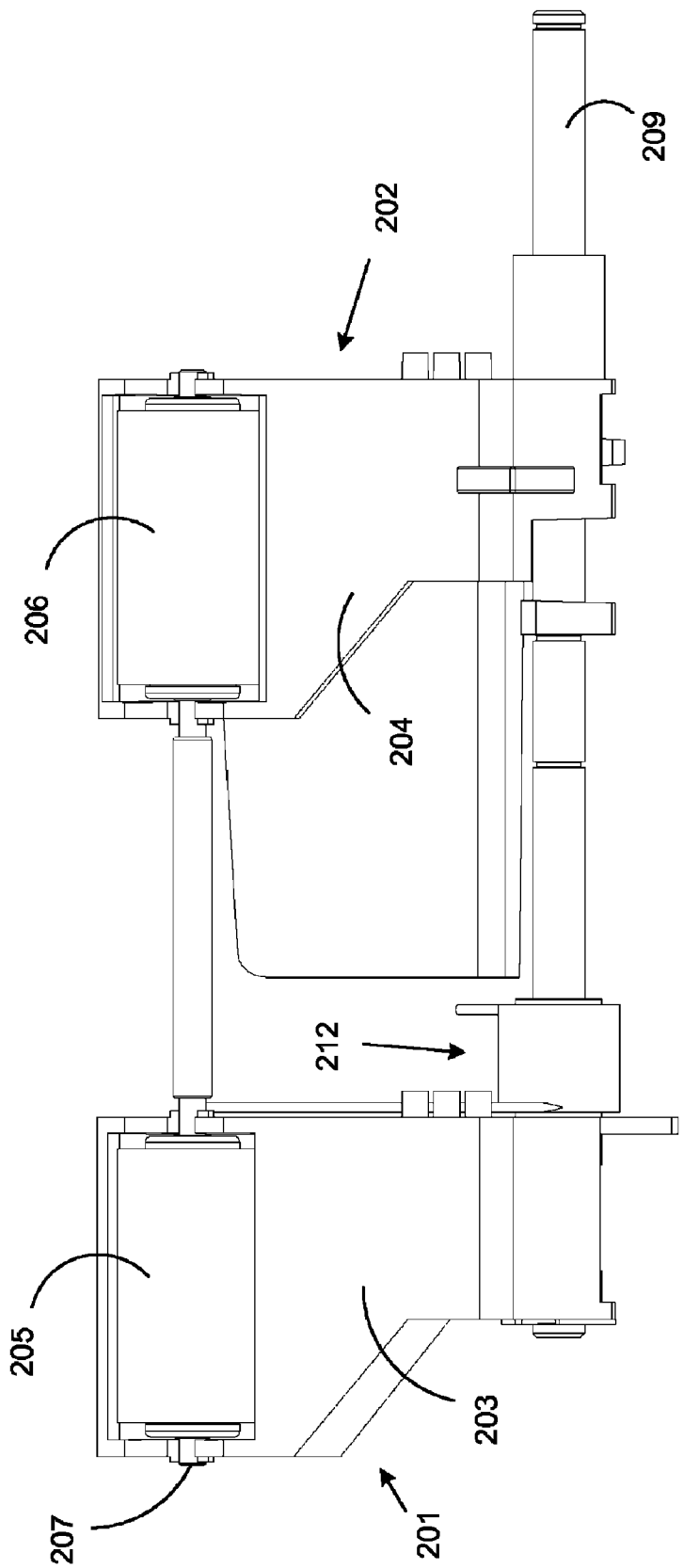
FIG. 2 illustrates an inboard ski and an outboard ski according to some embodiments.
Figure 2A:
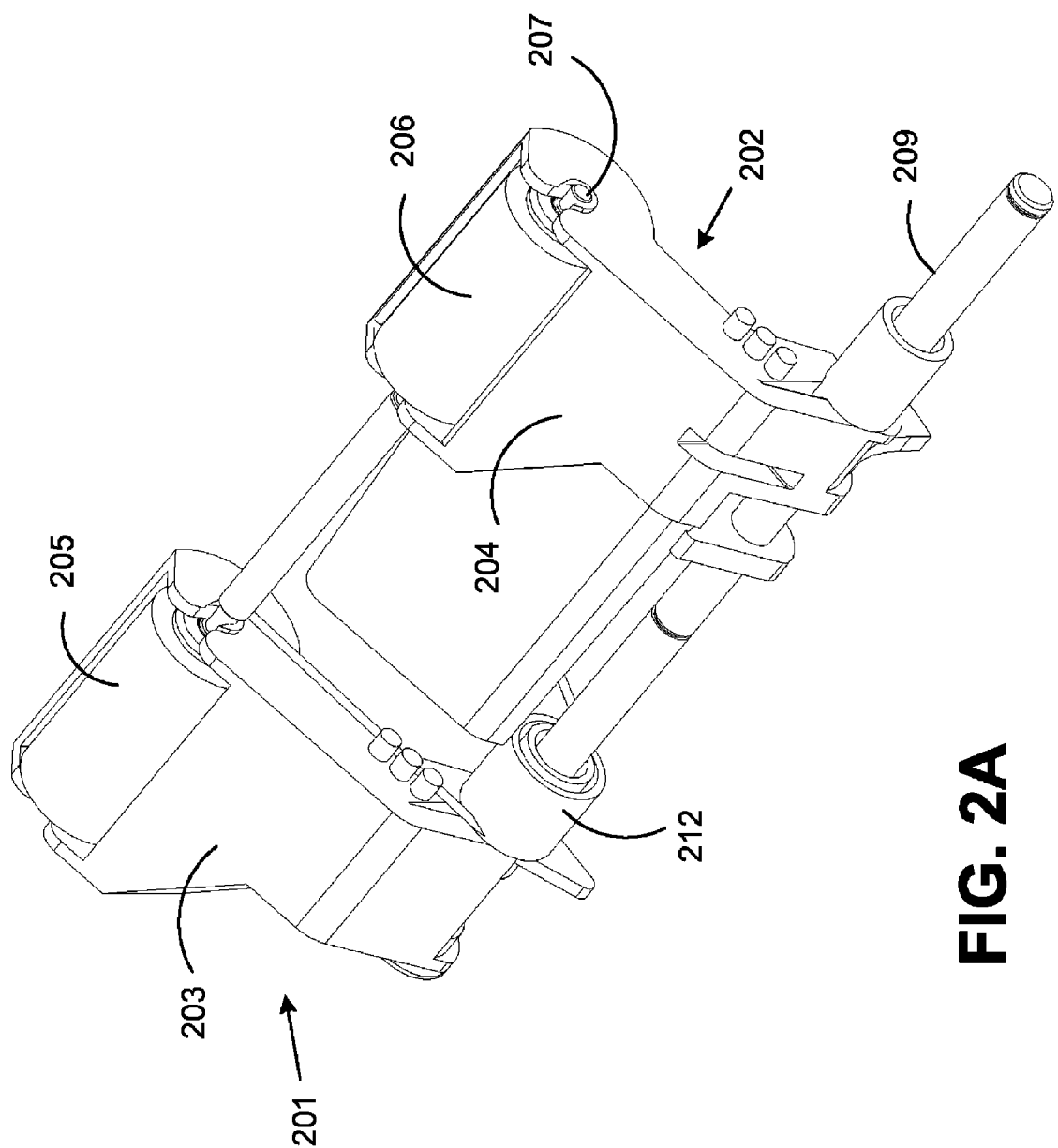
FIG. 2A illustrates a perspective view of an inboard ski and an outboard ski according to some embodiments.

Now referring to FIG. 2 and FIG. 2A, an embodiment of an inboard ski 201 (that is similar to ski 104) and an embodiment of an outboard ski 202 (that is similar to ski 105) are illustrated. In some embodiments, FIG. 2 illustrates a top view of the inboard ski 201 and the outboard ski 202 and FIG. 2A illustrates a perspective view of the of the inboard ski 201 and the outboard ski 202. The inboard ski 201 may comprise a inboard arm 203, an inboard roller 205, and a spring 212. The outboard ski 202 may comprise an outboard arm 204, and an outboard roller 206.

The inboard arm 203 may be coupled to the outboard arm 204 by a first pin 209 and a second pin 207. The inboard arm 204 may be coupled to the inboard roller 205 via the second pin 207. The second pin 207 may also couple the outboard arm 204 to the outboard roller 206. The second pin 207 may run lengthwise through a center of the inboard roller 205 and may run lengthwise through a center of the outboard roller 206.

The spring 212 may be coupled to the inboard arm 203 to allow the inboard arm 203 to pivot in a drive direction of the drive belt mechanism 101. In some embodiments, the spring may be coupled to the inboard arm 203 and the first pin 209.

The inboard roller 205 may be cylindrically shaped and the outboard roller 206 may be cylindrically shaped. The inboard roller 205 may have a same radius as the outboard roller 206. In some embodiments the inboard roller 205 and the outboard roller 206 may be comprised of rubber. In some embodiments, the inboard roller 205 and the outboard roller 206 may be comprised of urethane. In some embodiments, the inboard roller 205 and the outboard roller 206 rotate about the second pin 207.

Figure 3:
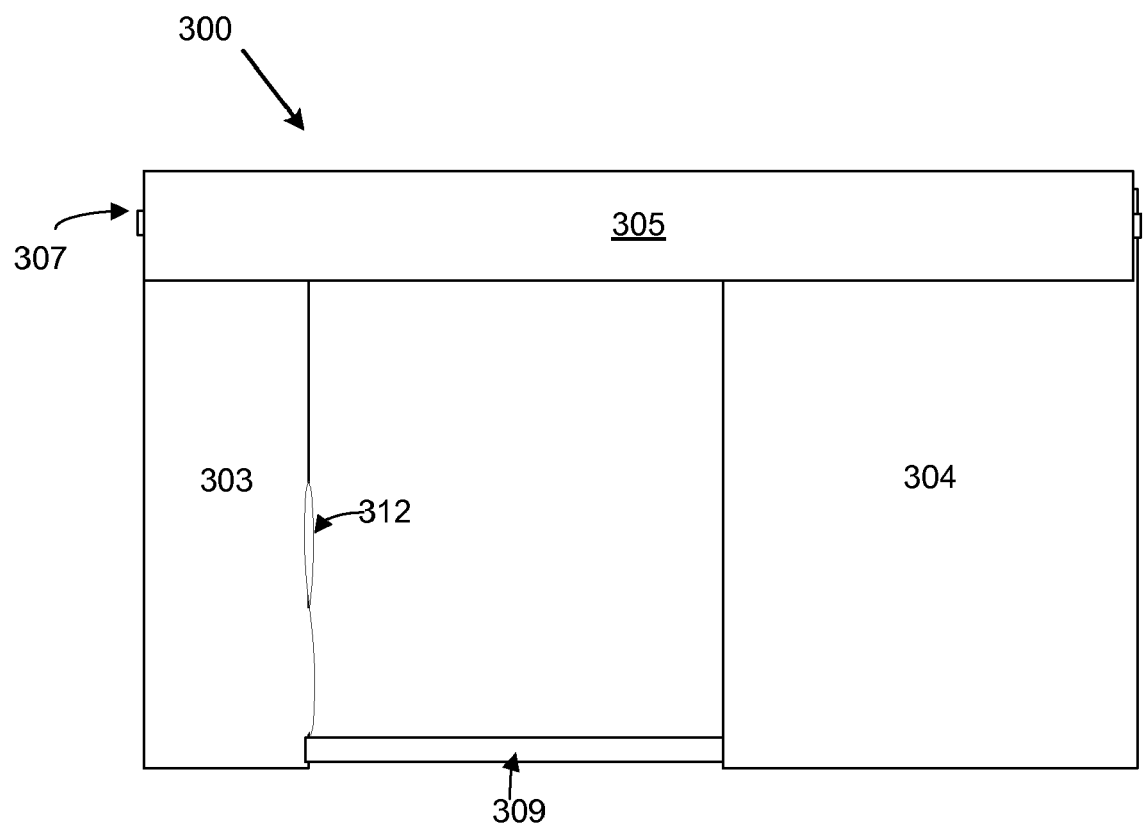
FIG. 3 illustrates a multi-arm ski according to some embodiments.

Now referring to FIG. 3, a multi-arm ski 300 is illustrated according to some embodiments. The multi-arm ski 300 may comprise a first arm 303 (that is similar to ski 104) and a second arm 304 (that is similar to ski 105). The first arm 303 and the second arm 304 may be coupled by a first pin 309 and a second pin 307. A roller 305 may be coupled between the first arm 303 and the second arm 304 and may be coupled to the first arm 303 and the second arm 304 by the second pin 307. The second pin 307 may run lengthwise through a center of the roller 305.

The roller 305 may extend to a distance from a registration wall of at least three and one half inches beyond a belt drive mechanism, such as that described with respect to FIG. 1. The roller may contact the mail piece to urge a mail piece upwardly toward the belt drive mechanism. By contacting the mail piece at least three and one half inches beyond a belt drive mechanism, the ski mechanism may decrease an amount of flutter experienced by the mail piece as it is weighted.

The spring 312 may be coupled to the first arm 303 and the first pin 309 to allow the first arm 303 to pivot in a drive direction of the drive belt mechanism 101. In some embodiments, the first arm 303 and the second arm 304 may be replaced by a transport arm that is wider than the first arm 303 and the second arm 304.

Figure 4:
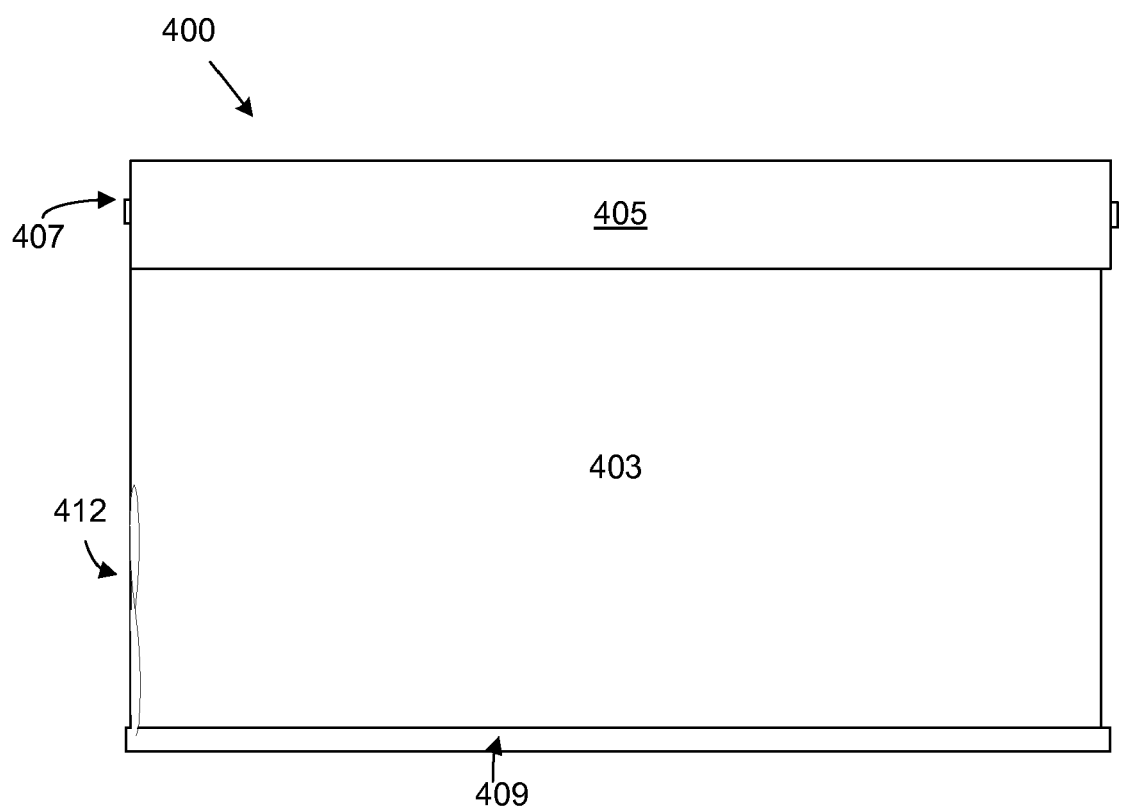
FIG. 4 illustrates a single-arm ski according to some embodiments.

Now referring to FIG. 4, a single-arm ski 400 is illustrated according to some embodiments. The single-arm ski 400 (that combines skis 104 and 105) may comprise an arm 403 coupled to a housing by a first pin 409. A roller 405 may be coupled to a top portion of the arm 403 by a second pin 407 that runs lengthwise through a center of the roller 405.

The roller 405 may extend to a distance from a registration wall of at least three and one half inches beyond a belt drive mechanism, such as that described with respect to FIG. 1. The roller 405 may contact the mail piece to urge a mail piece upwardly toward the belt drive mechanism. By contacting the mail piece at least three and one half inches beyond a belt drive mechanism, the ski mechanism may decrease an amount of flutter experienced by the mail piece as it is weighted.

The spring 412 may be coupled to the arm 403 and the first pin 409 to allow the arm 403 to pivot in a drive direction of the drive belt mechanism 101.

Figure 5:
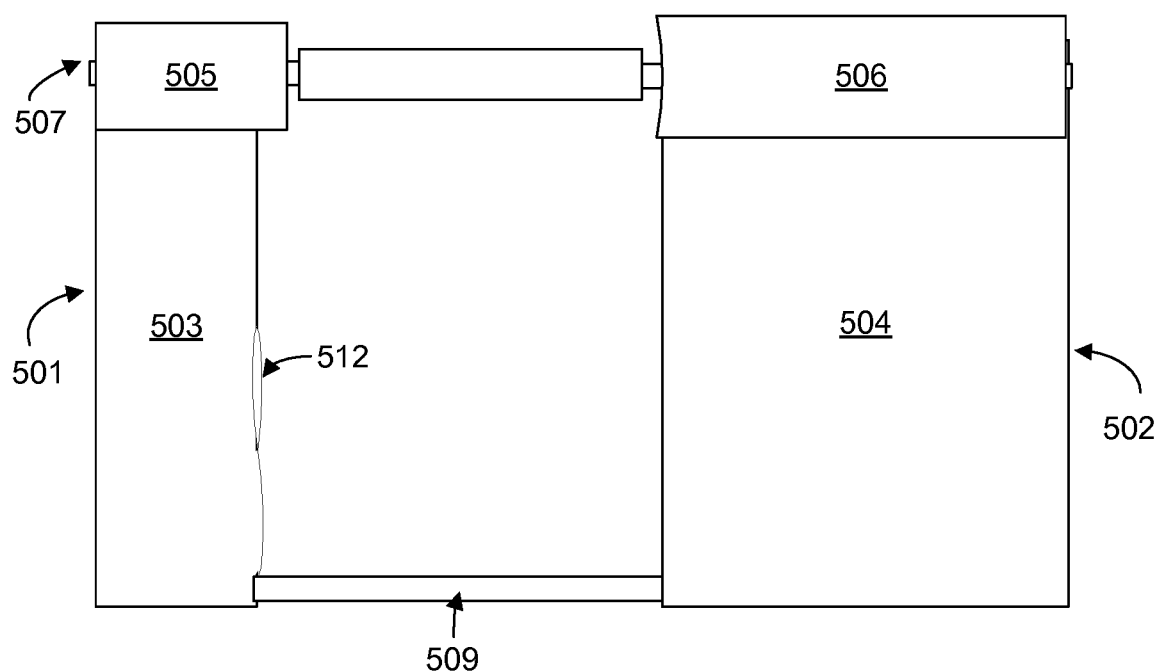
FIG. 5 illustrates an inboard ski and an outboard ski according to some embodiments.

Now referring to FIG. 5, an embodiment of an inboard ski 501 and an embodiment of an outboard ski 502 are illustrated. The inboard ski 501 may comprise a inboard arm 503, an inboard roller 505, and a spring 512. The outboard ski 502 may comprise an outboard arm 504, and an outboard roller 506.

The inboard arm 503 (that is similar to ski 104) may be coupled to the outboard arm 504 (that is similar to ski 105) by a first pin 509 and a second pin 507. The inboard arm 504 may be coupled to the inboard roller 505 via the second pin 507. The second pin 507 may also couple the outboard arm 504 to the outboard roller 506. The second pin 507 may run lengthwise through a center of the inboard roller 505 and may run lengthwise through a center of the outboard roller 506.

The spring 512 may be coupled to the inboard arm 503 to allow the inboard arm 503 to pivot in a drive direction of the drive belt mechanism 101. In some embodiments, the spring may be coupled to the inboard arm 503 and the first pin 509.

The inboard roller 505 may be cylindrically shaped and the outboard roller 506 may be cylindrically shaped. The outboard roller 506 may be wider than the inboard roller 505 and the outboard arm 504 may be wider than the inboard arm 503. The inboard roller 505 may have a same radius as the outboard roller 506. In some embodiments the inboard roller 505 and the outboard roller 506 may be comprised of rubber. In some embodiments, the inboard roller 505 and the outboard roller 506 may be comprised of urethane. In some embodiments, the inboard roller 505 and the outboard roller 506 rotate about the second pin 507.

Figure 6:
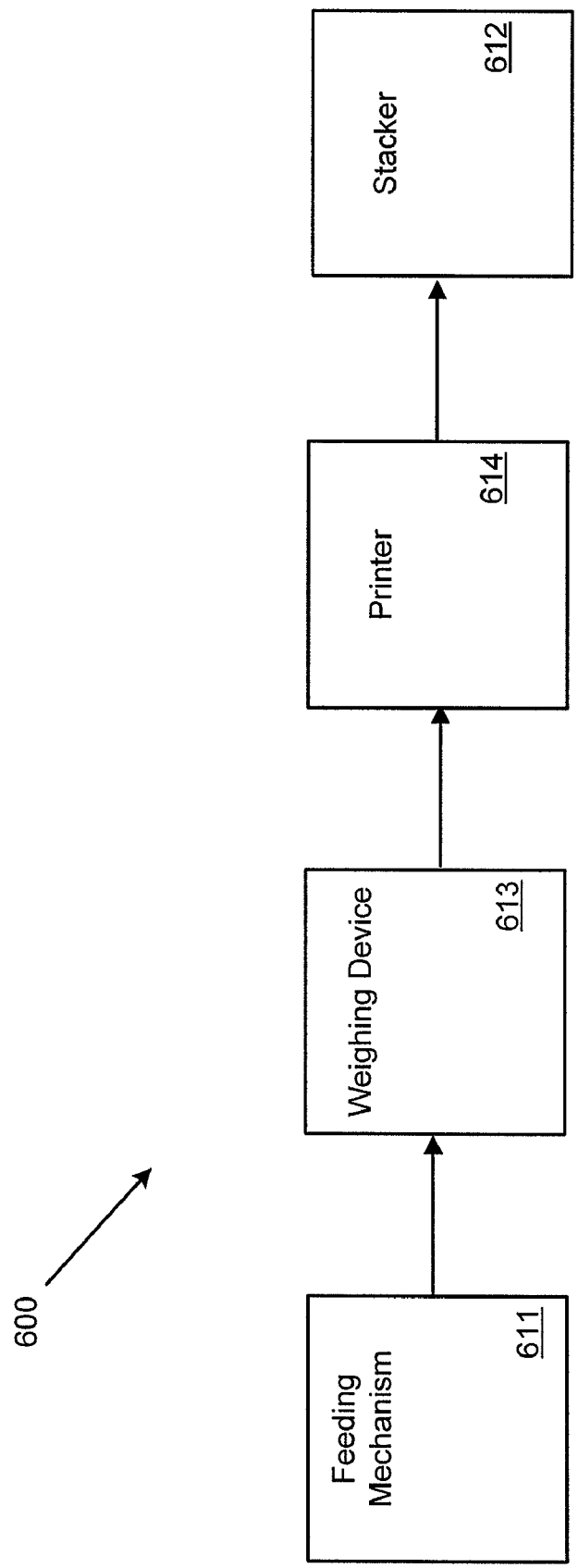
FIG. 6 illustrates a system according to some embodiments.

FIG. 6 discloses a system 600 according to some embodiments. The system 600 may comprise a feeder 611, a stacker 612, a printer 614, and an apparatus 613, such as that described with respect to FIG. 1, FIG. 1A, and FIG. 1B. The apparatus 613 may comprise a belt drive mechanism that includes a belt, a registration wall, a weighing device, a plurality of inboard skis, a plurality of first pins, a plurality of second pins, and a plurality of outboard skis as described with respect to similarly named elements of apparatus 100.

The feeder 611 may insert a plurality of mail pieces, one at a time, into the apparatus 613 to be weighed. Once weighed, the apparatus may move each mail piece to the printer 614 where appropriate indicia is printed on the mail piece. The mail piece is then transported to a stacker 612 that receives each mail piece and then stacks the plurality of mail pieces. The system may further comprise a moistener to moisten a flap of the mail piece and a sealer to seal the flap of the mail piece.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. An apparatus comprising:
a registration wall;
a weighing device located adjacent to the registration wall;
a belt drive mechanism extending across the weighing device for advancing a mail piece relative to the weighing device, wherein the belt drive mechanism is located at a first distance from the registration wall;
a plurality of inboard skis located substantially at the first distance from the registration wall and located beneath the belt drive mechanism for urging the mail piece upwardly toward the drive belt mechanism;
a plurality of outboard skis, coplanar with the plurality of inboard skis for supporting an end of the mail piece to stabilize the mail piece when the mail piece stops as the mail piece is being weighted by the weighing device, wherein the plurality of outboard skis is located at a second distance from the registration wall, and wherein the second distance is greater than the first distance; and wherein the plurality of inboard skis adjust to a thickness of a mail piece that is moved between the inboard skis and the drive belt mechanism, and wherein the plurality of outboard skis adjust to the thickness of the mail piece in response to the adjustment of the inboard skis.

2. The apparatus of claim 1, wherein the plurality of inboard skis are pivotally coupled to the weighing device, wherein the plurality of outboard skis are pivotally coupled to the weighing device, and wherein each ski of the plurality of inboard skis comprises a spring, and each ski of the plurality of outboard skis does not comprise a spring.

3. The apparatus of claim 1, wherein the plurality of inboard skis are inclined upwardly and towards a drive direction of the belt drive mechanism.

4. The apparatus of claim 1, wherein each of the plurality of inboard skis comprises a first arm and a first roller, wherein each of the plurality of outboard skis comprises a second arm and a second roller, and wherein the second arm is wider than the first arm.

5. The apparatus of claim 1, wherein each of the plurality of outboard skis is coupled to a respective one of the plurality of inboard skis via a first pin and via a second pin, wherein the first pin couples a bottom portion of a respective one of the plurality of outboard skis to a bottom portion of a respective one of the plurality of inboard skis, and wherein the second pin couples a top portion of a respective one of the plurality of outboard skis to a top portion of a respective one of the plurality of inboard skis.

6. The apparatus of claim 5, wherein the first roller is cylindrically shaped and the second roller is cylindrically shaped, and wherein the second pin runs lengthwise through a center of the first roller and runs lengthwise through a center of the second roller.

7. The apparatus of claim 1, wherein the plurality of inboard skis comprise a greater number than the plurality of outboard skis.

8. A apparatus comprising:
a registration wall;
a weighing device located adjacent to the registration wall;
a belt drive mechanism extending across the weighing device for advancing a mail piece relative to the weighing device, wherein the belt drive mechanism is located at a first distance from the registration wall;
a plurality of ski arms located substantially at the first distance from the registration wall and located beneath the belt drive mechanism, wherein the plurality of ski arms stabilizes the mail piece when the mail piece stops as the mail piece is being weighed by the weighing device; wherein the plurality of ski arms adjust to a thickness of a mail piece that is moved between the inboard skis and the drive belt mechanism, and wherein the plurality of outboard skis adjust to the thickness of the mail piece in response to the adjustment of the inboard skis; and
a plurality of rollers, each roller coupled to a top portion of a respective one of the plurality of ski arms, each roller extending to a distance from said registration wall of at least three and one half inches beyond said first distance, said rollers for contacting the mail piece to urge said mail piece upwardly toward said belt drive mechanism.

9. The weighing device of claim 8, wherein the plurality of ski arms are pivotally coupled to the weighing device.

10. The weighing device of claim 8, wherein the plurality of ski arms are inclined upwardly and towards a drive direction of the belt drive mechanism.

11. The apparatus of claim 8, wherein each of the plurality of inboard skis comprises a first arm and each of the plurality of outboard skis comprises a second arm, and wherein the second arm is wider than the first arm.

12. A system comprising:
- a weighing device comprising:
  - a registration wall, wherein the weighing device located adjacent to the registration wall;
  - a belt drive mechanism extending across the weighing device for advancing a mail piece relative to the weighing device, wherein the belt drive mechanism is located at a first distance from the registration wall;
  - a plurality of inboard skis located substantially at the first distance from the registration wall and located beneath the belt drive mechanism for urging the mail piece upwardly toward the drive belt mechanism; and
  - a plurality of outboard skis, coplanar with the plurality of inboard skis for supporting an end of the mail piece to stabilize the mail piece when the mail piece stops as the mail piece is being weighed by the weighing device, wherein the plurality of outboard skis is located at a second distance from the registration wall, and wherein the second distance is greater than the first distance; wherein the plurality of inboard skis adjust to a thickness of a mail piece that is moved between the inboard skis and the drive belt mechanism, and wherein the plurality of outboard skis adjust to the thickness of the mail piece in response to the adjustment of the inboard skis:
- a feeding mechanism to feed a plurality of mail pieces into the weighing device;
- a printer to receive the plurality of mail pieces from the weighing device and to print indicia on the mail pieces; and
- a stacker to receive the plurality of mail pieces from the printer.

13. The system of claim 12, wherein the plurality of inboard skis are pivotal coupled to the weighing device, wherein the plurality of outboard skis are pivotal coupled to the weighing device, and wherein each ski of the plurality of inboard skis comprises a spring, and each ski of the plurality of outboard skis does not comprise a spring.

14. The system of claim 12, wherein the plurality of inboard skis are inclined upwardly and towards a drive direction of the belt drive mechanism.

15. The system of claim 12, wherein each of the plurality of inboard skis comprises a first arm and a first roller, wherein each of the plurality of outboard skis comprises a second arm and a second roller, and wherein the second arm is wider than the first arm.

16. The system of claim 12, wherein each of the plurality of outboard skis is coupled to a respective one of the plurality of inboard skis via a first pin and via a second pin, wherein the first pin couples a bottom portion of a respective one of the plurality of outboard skis to a bottom portion of a respective one of the plurality of inboard skis, and wherein the second pin couples a top portion of a respective one of the plurality of outboard skis to a top portion of a respective one of the plurality of inboard skis.

* * * * *